June 7, 1960     J. H. McCARTHY ET AL     2,939,346
TWO-STEP GEAR REDUCTION MECHANISM
Filed Nov. 1, 1957     2 Sheets-Sheet 2
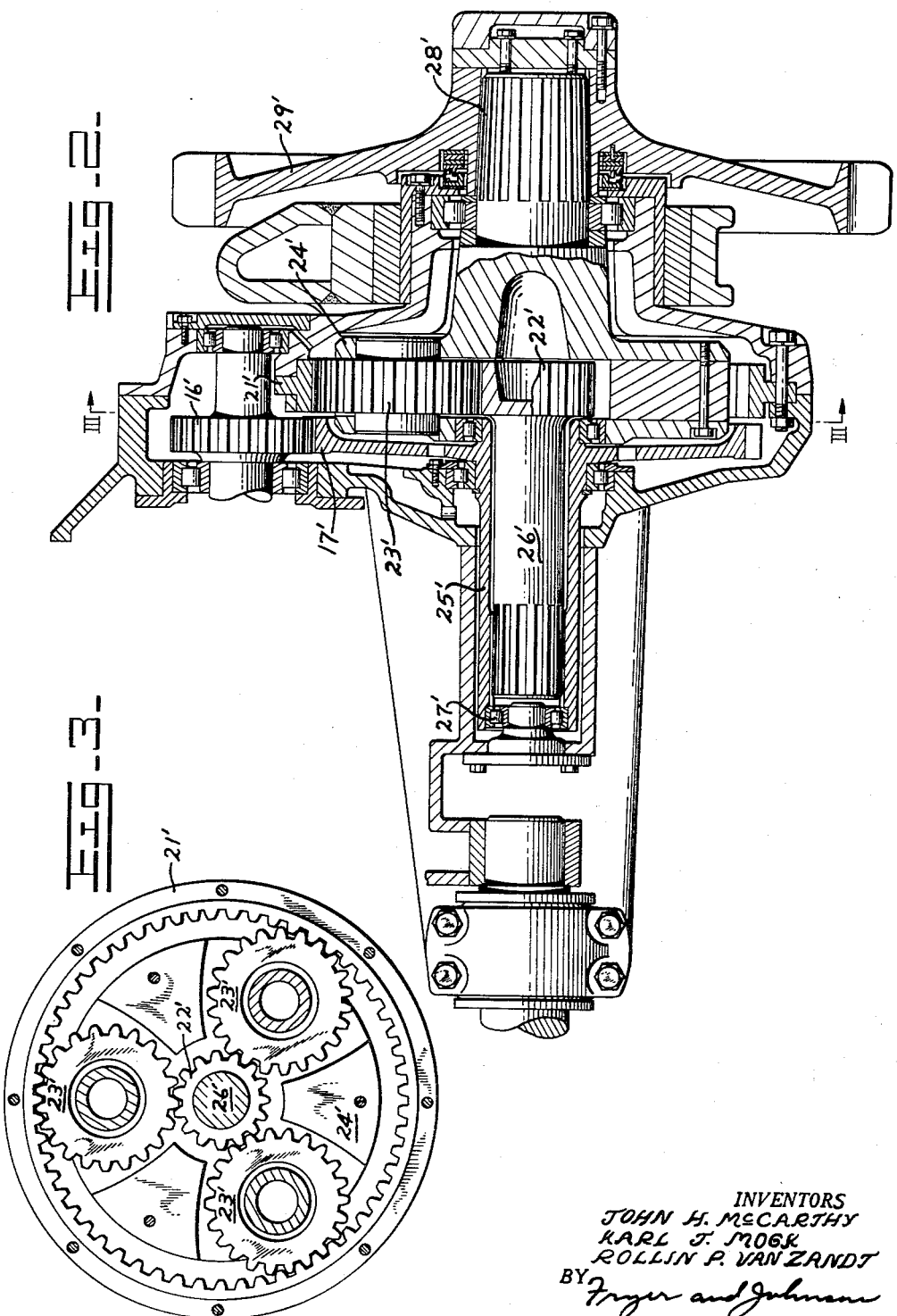
INVENTORS
JOHN H. McCARTHY
KARL J. MOGK
ROLLIN P. VAN ZANDT
BY
ATTORNEYS United States Patent Office 2,939,346
Patented June 7, 1960

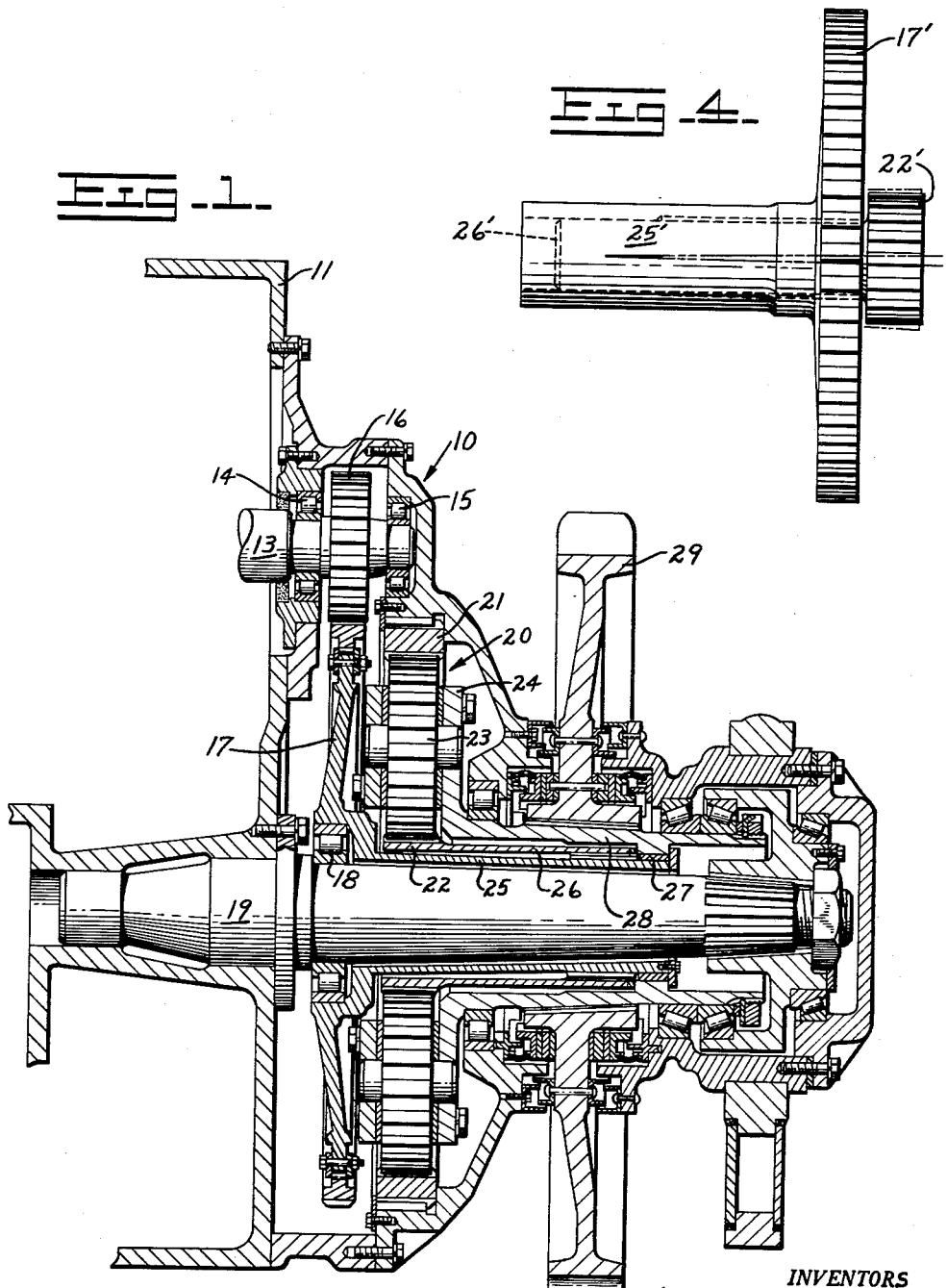

2,939,346
TWO-STEP GEAR REDUCTION MECHANISM

John H. McCarthy, Peoria, Ill., Karl J. Mogk, Wauwatosa, Wis., and Rollin P. Van Zandt, Peoria, Ill., assignors to Caterpillar Tractor Co., Peoria, Ill., a corporation of California Filed Nov. 1, 1957, Ser. No. 693,939

3 Claims. (Cl. 74—801)

This invention relates to a two-step gear reduction mechanism for applying driving torque to the driving wheels of heavy duty vehicles, such as trucks, tractors, and the like, in which the first gear reduction is of the pinion and mating reduction gear type and the second gear reduction is of the planetary type. More particularly, this invention relates to an improved connection between the first and second reduction units.

It is common practice in mechanisms of this kind to space the two reduction units remotely or at a relatively long axial distance so that the connecting sun gear drive shaft will flex a sufficient amount to permit the sun gear of the planetary system to be centered with relation to the planet gears. With this arrangement, however, the width of the mechanism is unduly increased, thereby possibly weakening the structure and substantially increasing the over-all vehicle width.

It is, therefore, an object of the present invention to provide a two-step gear reduction mechanism in which the planetary gear unit is disposed immediately adjacent the larger diameter reduction gear of a spur-gear reduction unit.

Another object of this invention is to provide a two-step gear reduction mechanism comprising a spur-gear unit and a planetary system in which the sun gear of the planetary unit is driven by the large diameter spur-gear from a point remote from the reduction units.

A further object of this invention is to provide a driving connection between a spur-gear reduction unit closely adjacent a planetary reduction unit of a two-step gear reduction mechanism which will permit self-centering of the sun gear of the planetary unit.

Further and more specific objects and advantages of the invention will be made apparent in the following specification wherein reference is made to the accompanying drawings.

In the drawings:

Fig. 1 is a section taken in a vertical plane transversely of a sprocket and gear reduction assembly of a tractor embodying the present invention;

Fig. 2 is a similar view showing a modification of the present invention;

Fig. 3 is a sectional view taken along the line III—III of Fig. 2; and

Fig. 4 is a view in elevation of the large diameter reduction gear associated with the sun gear of the planetary reduction unit shown in Fig. 2.

Referring to Fig. 1 of the drawings, a final drive housing generally indicated at 10 is rigidly secured to a vehicle power transmission case partially shown at 11. Power is directed to a pinion shaft 13 which is journalled in bearings 14 and 15 in housing 10. A pinion gear 16 is disposed on shaft 13 in mating relation with a large diameter reduction gear 17 to comprise the first gear reduction unit. Gear 17 is rotatably supported by a bearing 18 on a non-rotatable axle shaft 19 rigidly supported in case 11.

A planetary second reduction unit indicated generally at 20 is disposed immediately adjacent the first reduction unit and comprises an internally toothed ring gear 21 rigidly secured to the final drive housing 10 and a sun gear 22 disposed in driving relation with a plurality of planet gears 23 which also mesh with the ring gear. The planets 23 are carried by the usual pins supported by a carrier member 24. The large diameter gear 17 and the sun gear 22 are each provided with integral coaxial hollow shaft portions 25 and 26, respectively, which extend outwardly with respect to the center line of the vehicle. Shaft 25 telescoping within shaft 26 is supported at its outer end by a sleeve bearing 27. Bearing 27 permits relative rotation between shaft 25 and a hollow shaft portion 28 integral with carrier 24.

A sprocket 29 is shown as rigidly secured to shaft 28 for the purpose of transmitting the drive to the ground engaging means (not shown) such for example, as the track of a track type tractor. Shaft 28 is also retained with relation to shaft 19 by an arrangement of bearings, as fully disclosed in the Risk et al. Patent 2,702,603. A loosely splined connection is provided between shafts 25 and 26 at their ends adjacent bearing 27 for transmitting the drive from the large diameter gear 17 to the sun gear 22. This connection permits a certain amount of misalignment between shafts 25 and 26 to allow self-centering of the sun gear 22 with respect to the planets 23, a best seen in Fig. 3 of the drawings. In addition, a certain amount of beam deflection is provided by the relatively thin wall of the shaft 26 which enhances the sun gear centering characteristic of the loosely splined connection. The drive is then transmitted by the sun gear 22 through the planetary set where the second reduction takes place, and from there through shaft 28 to the sprocket 29. This arrangement permits the first and second reduction units to be disposed immediately adjacent one another and thereby substantially reduces objectionable projection of the mechanism from the vehicle.

A modification of the structure just described is shown in Fig. 2 of the drawings. In the modified design, a driving pinion 16' is disposed in mating relation with a large diameter reduction gear 17' to thereby provide the first reduction. A hollow shaft member 25' integral with gear 17' extends inwardly toward the center line of the vehicle and is rotatably supported at its extended end by a bearing 27' retained on a stub shaft secured to the vehicle frame as shown. A planetary second reduction unit is disposed immediately adjacent the first unit and comprises a ring gear 21' rigidly secured to the final drive housing and a sun gear 22' disposed in mating relation with a plurality of planet gears 23'. The planets 23' are carried by and rotate with respect to a carrier member 24'. A solid shaft portion 28' integral with carrier 24' supports a sprocket 29' for transmitting the drive to the ground engaging means (not shown).

A solid shaft 26' integral with sun gear 22' is disposed within shaft 25' and extends through gear 17' to position sun gear 22' immediately adjacent gear 17', thereby substantially reducing objectionable projection of the mechanism from the vehicle. A loosely splined connection is provided between shafts 25' and 26' at their ends adjacent bearing 27' for transmitting the drive between gear 17' and sun gear 22'. As in the structure shown in Fig. 1, this connection also permits misalignment of shafts 25' and 26' (Fig. 4) and allows self-centering of sun gear 22' with respect to the planet gears 23'.

While the structure is described herein as adapted to a vehicle final drive, it is apparent that it could also be advantageously used in similar applications where axial space is at a premium.

We claim:

1. In a two-step gear reduction mechanism, a first reduction unit, a planetary second reduction unit including a sun gear immediately adjacent the first unit, the first unit comprising a pinion and a reduction gear, a pair of telescoping shafts, one of the shafts being integral with the reduction gear of the first unit, the other of said shafts being integral with the sun gear of the second unit, and said shafts being connected at their ends remote from the gear units by loosely mating splines permitting oscillation of the sun gear in a plane normal to the axis of rotation.

2. A two-step gear reduction mechanism comprising a first reduction unit of the spur-gear type having a pinion gear, a mating reduction gear and a hollow shaft integral with said reduction gear, a second reduction unit of the planetary type including a sun gear immediately adjacent the first reduction unit and a hollow shaft integral with said sun gear, the hollow shaft of the first unit extending through said sun gear and into said hollow shaft of the second unit, and a loosely mating splined connection between said hollow shafts at their ends remote from the units to permit oscillation of the sun gear in a plane normal to the axis of rotation.

3. A two-step gear reduction mechanism comprising a first reduction unit of the spur-gear type having a pinion gear, a mating reduction gear and a hollow shaft integral with said reduction gear, a second reduction unit of the planetary type including a sun gear immediately adjacent the first reduction unit and a solid shaft integral with said sun gear and extending through said reduction gear of the first unit and into said hollow shaft of the first unit, and a loosely mating splined connection between said hollow and solid shafts at their ends remote from the units to permit oscillation of the sun gear in a plane normal to the axis of rotation.

References Cited in the file of this patent

UNITED STATES PATENTS

| | | |
|---|---|---|
| 2,289,285 | Chilton | July 7, 1942 |
| 2,646,297 | Crichton et al. | July 21, 1953 |
| 2,759,376 | Chamberlin et al. | Aug. 21, 1956 |
| 2,802,377 | Berthiez | Aug. 13, 1957 |

FOREIGN PATENTS

| | | |
|---|---|---|
| 109,437 | Great Britain | July 18, 1918 |
| 412,540 | Great Britain | Oct. 31, 1932 |
| 660,497 | Great Britain | Nov. 7, 1951 |
| 714,232 | Great Britain | Aug. 25, 1954 |